US011878615B2

(12) United States Patent
Rabe et al.

(10) Patent No.: US 11,878,615 B2
(45) Date of Patent: Jan. 23, 2024

(54) HEADREST TUBE AND METHOD OF FORMING SAME

(71) Applicant: Innotec, Corp., Zeeland, MI (US)

(72) Inventors: Hassan Salim Rabe, Holland, MI (US); Micah Lane Schreur, Hudsonville, MI (US); Ryan Scott Hoek, Zeeland, MI (US)

(73) Assignee: Innotec, Corp., Zeeland, MI (US)

( * ) Notice: Subject to any disclaimer, the term of this patent is extended or adjusted under 35 U.S.C. 154(b) by 4 days.

(21) Appl. No.: 17/608,342

(22) PCT Filed: May 6, 2020

(86) PCT No.: PCT/US2020/031637
§ 371 (c)(1),
(2) Date: Nov. 2, 2021

(87) PCT Pub. No.: WO2020/227384
PCT Pub. Date: Nov. 12, 2020

(65) Prior Publication Data
US 2022/0203877 A1 Jun. 30, 2022

Related U.S. Application Data

(60) Provisional application No. 62/844,322, filed on May 7, 2019.

(51) Int. Cl.
*B60N 2/803* (2018.01)
*B21D 41/04* (2006.01)
*B60N 2/80* (2018.01)

(52) U.S. Cl.
CPC ............ *B60N 2/803* (2018.02); *B21D 41/04* (2013.01); *B60N 2002/899* (2018.02)

(58) Field of Classification Search
CPC ........ B60N 2/803; B60N 2/806; B60N 2/897; B60N 2/894; B60N 2002/899; B21D 41/04
See application file for complete search history.

(56) References Cited

U.S. PATENT DOCUMENTS

| 2,846,241 A | 8/1958 | McDonnell et al. |
| 5,000,137 A | 3/1991 | Wreinert et al. |
| (Continued) | | |

FOREIGN PATENT DOCUMENTS

| CN | 109128831 | 1/2019 |
| JP | 1170535 | 7/1989 |
| (Continued) | | |

OTHER PUBLICATIONS

Module 3 FORGING, https://www.rajagiritech.ac.in/Home/mech/Course_Content/Semester IV/ME 220 Manufacturing Technology/Module 3.pdf, pp. 1-118, retrieved Apr. 6, 2020.
(Continued)

*Primary Examiner* — Philip F Gabler
(74) *Attorney, Agent, or Firm* — Warner Norcross + Judd LLP

(57) ABSTRACT

The present disclosure provides a method of manufacturing a headrest stay formed end. The method includes cutting teeth on the insertion end of a headrest stay and pressing the teeth inwardly to form a chamfered endform on the insertion end. A headrest stay having a chamfered endform comprising a plurality of curved teeth is also provided.

20 Claims, 11 Drawing Sheets

(56) References Cited

U.S. PATENT DOCUMENTS

| | | | | |
|---|---|---|---|---|
| 5,080,437 | A * | 1/1992 | Pesta | B60N 2/818 |
| | | | | 248/408 |
| 5,445,434 | A * | 8/1995 | Kohut | B60N 2/826 |
| | | | | 297/391 |
| 6,641,219 | B2 | 11/2003 | Meshke et al. | |
| 8,397,349 | B2 * | 3/2013 | Nishiura | B60N 2/888 |
| | | | | 297/216.12 |
| 9,403,457 | B2 * | 8/2016 | Nakata | B60N 2/809 |
| 10,160,069 | B2 | 12/2018 | Nasu et al. | |
| 10,252,653 | B2 * | 4/2019 | Winkelbach | B60N 2/80 |
| 10,327,555 | B2 * | 6/2019 | Okumura | A47C 7/38 |
| 2006/0236520 | A1 | 10/2006 | Arai | |
| 2008/0164730 | A1 * | 7/2008 | Watson | B60N 2/809 |
| | | | | 297/216.12 |
| 2009/0235711 | A1 * | 9/2009 | Pesch | B21D 17/02 |
| | | | | 72/214 |
| 2016/0263713 | A1 | 9/2016 | Nasu et al. | |
| 2017/0008433 | A1 * | 1/2017 | Shiotsu | B60N 2/6009 |

FOREIGN PATENT DOCUMENTS

| | | |
|---|---|---|
| JP | 2006082793 | 3/2006 |
| JP | 2014161513 | 9/2014 |
| JP | 2018144606 | 9/2018 |
| JP | 201914336 | 1/2019 |
| KR | 100743370 | 7/2007 |
| KR | 1020130110248 | 10/2013 |
| WO | 2003021113 | 3/2003 |
| WO | 2011018061 | 2/2011 |
| WO | 2019202647 | 10/2019 |

OTHER PUBLICATIONS

Wuxi Zhongtuo Roll Forming Machinery Co Ltd, Pipe diameter reducing tool reduce tube diameter endformer China Manufacturer, https://www.rollformertec.com/pipe-bending-machine/56981225.html, pp. 1-13, retrieved Apr. 6, 2020.

Likest, CisFun Technology Corp., Pipe Cutting and Chamfering Machine, https://www.likest.com/tube_cutting_and_chamfering_machine/index.htm, pp. 1-3, retrieved Apr. 6, 2020.

Likest, CisFun Technology Corp., Tube Cold Drawing Machine, https://www.likest.com/tube_cold_drawing_machine/index.htm, pp. 1-2, retrieved Apr. 6, 2020.

* cited by examiner

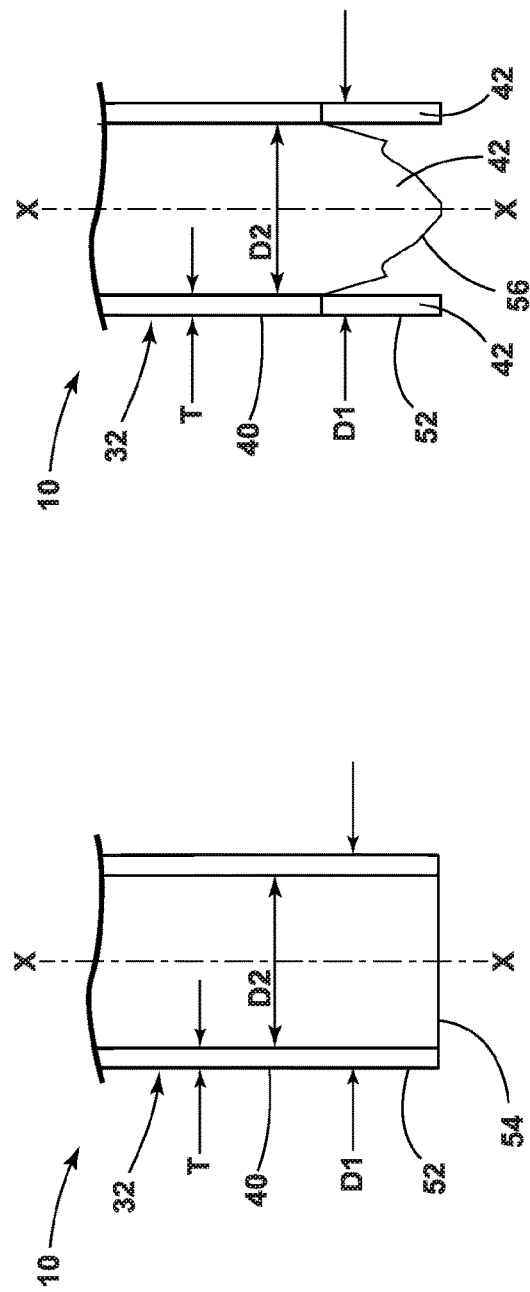
FIG. 9
FIG. 10
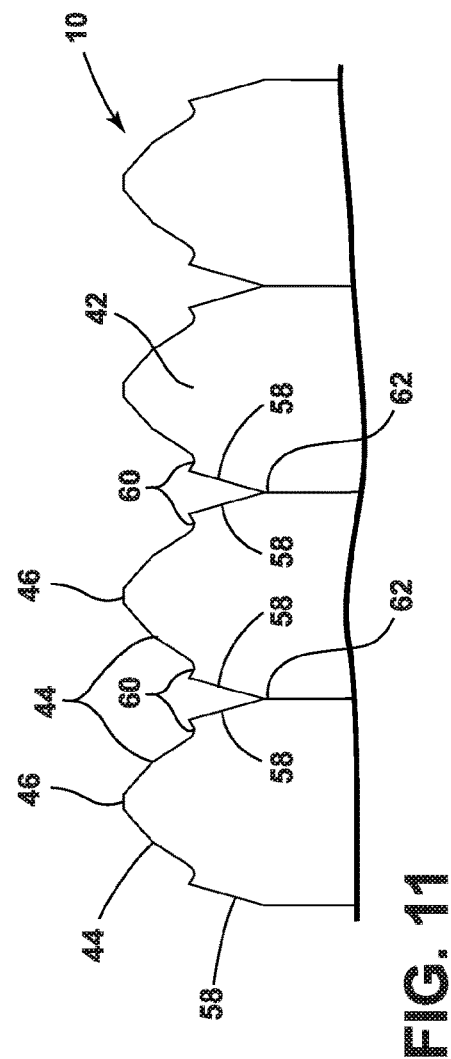
FIG. 11

HEADREST TUBE AND METHOD OF FORMING SAME

CROSS-REFERENCE TO RELATED APPLICATION(S)

This application claims to benefit of U.S. Provisional Patent Application No. 62/844,322, filed May 7, 2019, which is incorporated herein by reference in its entirety.

BACKGROUND OF THE INVENTION

In the current vehicle market for headrests, a chamfer or endform is common on the end of the headrest stay to allow for easier insertion of the headrest into the seat sleeve. The endform is also used to push the locking pin in the sleeve out of the way during assembly of the headrest into the car seat. The force required to form an endform is considerable, requiring on average 30,000 lbs. of force, and can cause swell to the outer diameter of the tube to a point where the tube does not function properly with the mating sleeve. Other known methods can lower the endforming force, but require significantly more cycle time since multiple passes are necessary to complete the endform.

FIG. 1A shows an example of a typical existing headrest stay 200 with a straight cut end 202 prior to formation of an endform on the tube 200. FIG. 1B shows the headrest stay 200 after formation of an endform 204 on the tube 200. As noted above, the force required to form the endform 204 on the straight cut end 202 is considerable, and can result in an unusable headrest stay.

SUMMARY OF THE INVENTION

Embodiments of the present disclosure relate a method of manufacturing a headrest stay. More specifically, an improved method for forming a chamfered endform on a headrest stay is disclosed. Embodiments of the present disclosure also relate to an improved headrest stay.

According to one aspect of the disclosure, a method for manufacturing a headrest stay formed end includes removing material from a tubular body having longitudinal axis to form a plurality of teeth on the tubular body and pressing the plurality of teeth inward toward the longitudinal axis of the tubular body to form a chamfered endform on the tubular body.

According to another aspect of the disclosure, a headrest stay includes a tubular body having at least one insertion end defining a longitudinal axis, a chamfered endform on the at least one insertion end, and a hole formed through the chamfered endform, wherein the chamfered endform comprises a plurality of teeth curved toward the longitudinal axis.

These and other features and advantages of the present disclosure will become apparent from the following description of particular embodiments, when viewed in accordance with the accompanying drawings and appended claims.

DESCRIPTION OF THE DRAWINGS

In the drawings:

FIG. 9 is a cross-sectional view of one end of the headrest stay prior to cutting teeth in the end;

FIG. 10 is a cross-sectional view of the headrest stay of FIG. 9 prior to endforming and after a plurality of teeth have been cut in the end;

FIG. 11 is a plane view of the teeth of the headrest stay of FIG. 10 as they would appear if the end were unrolled and laid in a flat condition;

DETAILED DESCRIPTION OF THE INVENTION

Figure 2:
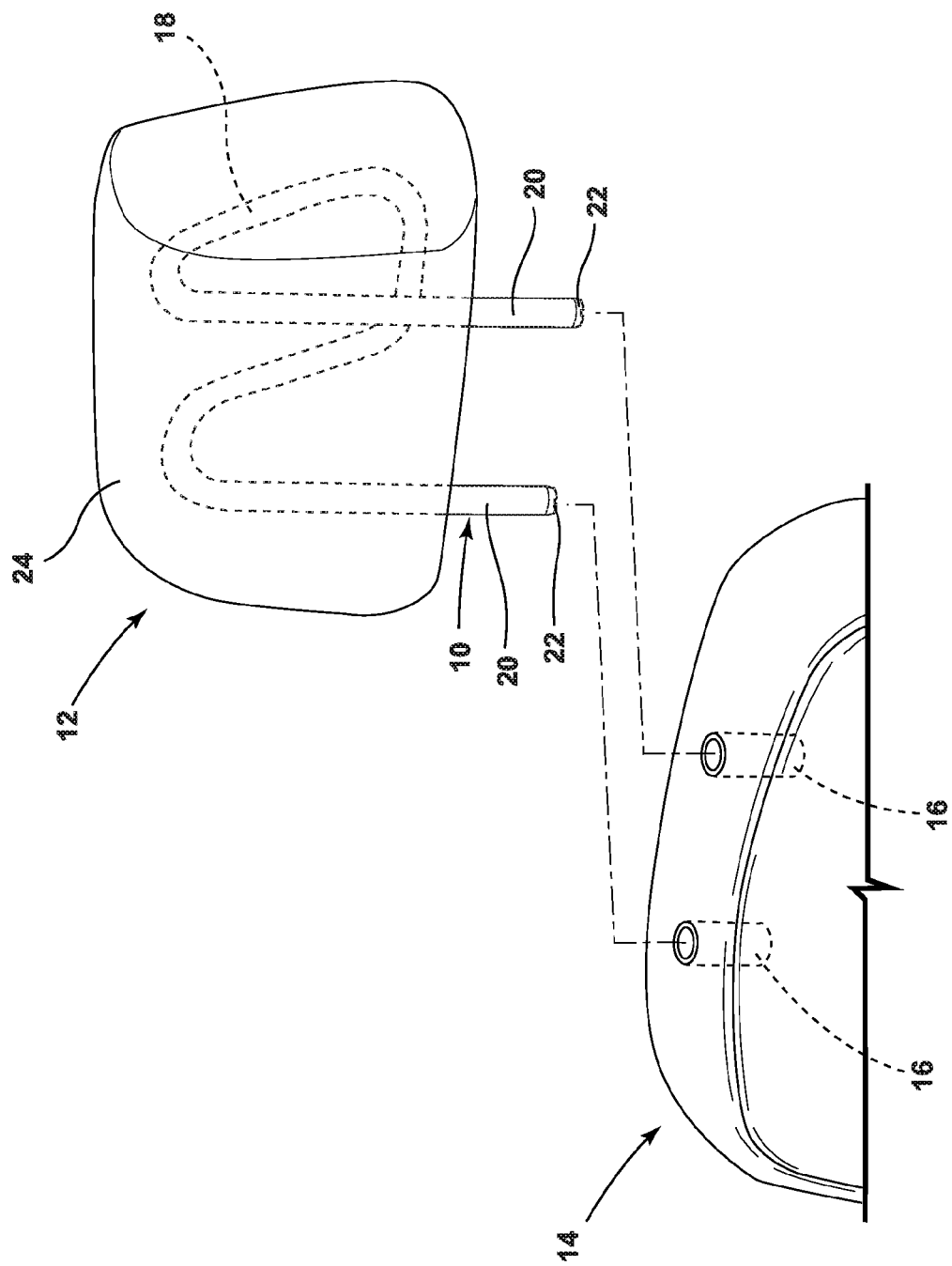
FIG. 2 is a perspective view illustrating a headrest equipped with a headrest stay according to an embodiment of the present disclosure attached to a vehicle seat.

FIG. 2 shows a headrest 12 equipped with a headrest stay 10 manufactured according to a method of the present invention. The headrest 12 is attached to a vehicle seat 14. The vehicle seat 14 includes a pair of spaced headrest sleeves 16 at an upper end thereof. The sleeves 16 can be attached to the vehicle seat 14 using any suitable means. In one example, sleeve supports (not shown) can be embedded in the seat 14 for receiving and supporting the sleeves 16. The headrest stay 10 of the headrest 12 is inserted into the sleeves 16 to mount the headrest 12 to the vehicle seat 14.

The headrest stay 10 can comprise a round pipe or tube bent into an approximate U-shape to define a base 18 with legs 20 extending from the ends of the base 18 and defining insertion ends 22 of the stay 10. A portion of the headrest stay 10, such as the base 18 and proximal portions of the legs 20, can be embedded in a cushioning portion or pad 24 of the headrest 12, with the insertion ends 22 exposed and protruding downward from a bottom of the pad 24.

The headrest stay 10 can comprise a complex U-shape, such as with one or more bends in the legs 20 and/or base 18, such that the base 18, and in some cases proximal portions of the legs 20 are out of plane with the insertion ends 22. In another embodiment, the headrest stay 10 can comprise a planar U-shape, i.e. with the base 18 and legs 20 lying in one plane. Alternatively to one continuous approximate U-shaped pipe, the headrest 12 can comprise two separate headrest stays 10, each comprising an I-shaped post having one of the insertion ends 22. In this case, a pair of headrest stays 10 can be provided for the headrest 12, with proximal ends of each stay 10 embedded in the pad 24 or otherwise inserted into the headrest 12. It is noted that the proximal ends of the I-shaped stays can comprise ends formed according to the method described herein, such that both ends of the I-shaped stays comprise endforms.

Suitable materials for the headrest stay 10 include, but are not limited to, steel, alloy steel, stainless steel, brass, bronze, or aluminum. The headrest stay 10 can be plated on its outer surface for rust prevention and decoration. Suitable plating materials for the headrest stay 10 include, but are not limited to, nickel-chrome and zinc.

Figure 4:
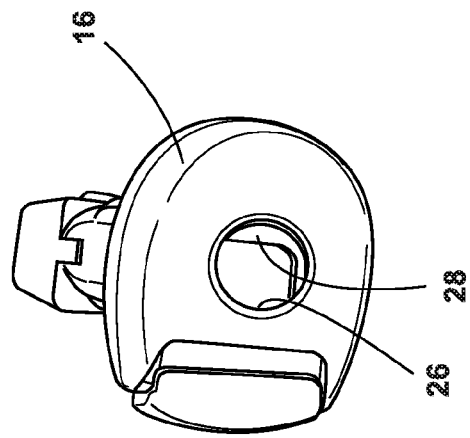
FIG. 4 is a perspective view of the headrest sleeve of FIG. 3, showing a locking pin or blade within the headrest sleeve.
Figure 3:
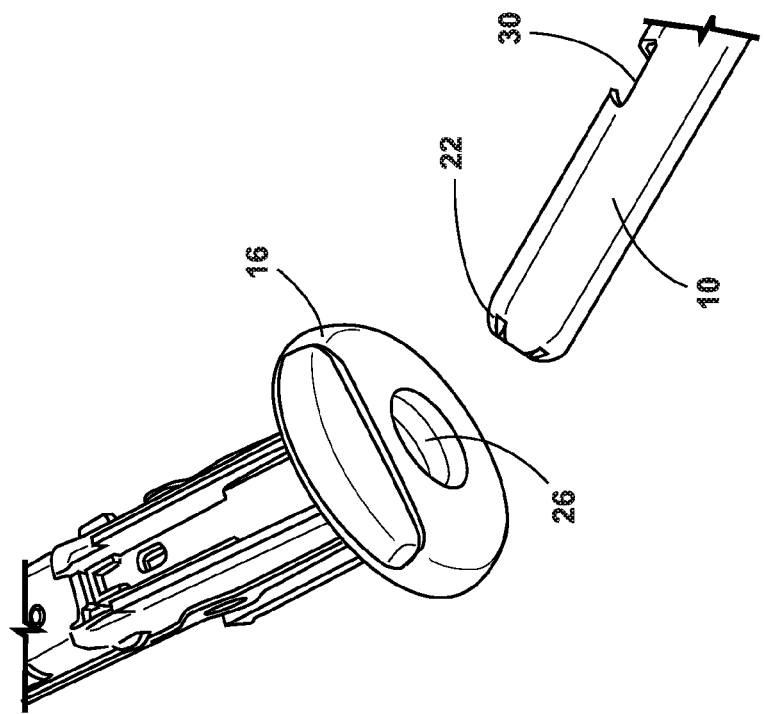
FIG. 3 is an exploded view showing a portion of the headrest stay and a headrest sleeve from FIG. 2.

Referring additionally to FIGS. 3-4, each sleeve 16 includes an elongated hole 26 into which the ends 22 of the headrest stay 10 are insertable. The headrest sleeve 16 includes a locking pin or blade 28 within the elongated hole 26. The headrest stay 10 can comprise a complementary notch 30, hole, or other feature in the insertion end 22 configured to receive the blade 28. When the headrest 12 is fixed to the vehicle seat 14, with the insertion ends 22 of the headrest stay 10 inserted into the sleeves 16, the notches 30 on the insertion ends 22 receive the blades 28 in the sleeves 16 to engage the headrest stay 10 with the sleeves 16, thereby retaining the headrest 12 on the vehicle seat 14.

The headrest 12 can optionally be adjustable to position the headrest 12 at a desired elevation relative to the seat 14. For example, the headrest stay 10 can be provided with additional notches 30, holes, or other features, which engage with the locking blade 28 to retain the headrest 12 at a desired elevation. The headrest stay 10 can slide within the sleeves 16 during adjustment of the headrest 12.

Figure 5:
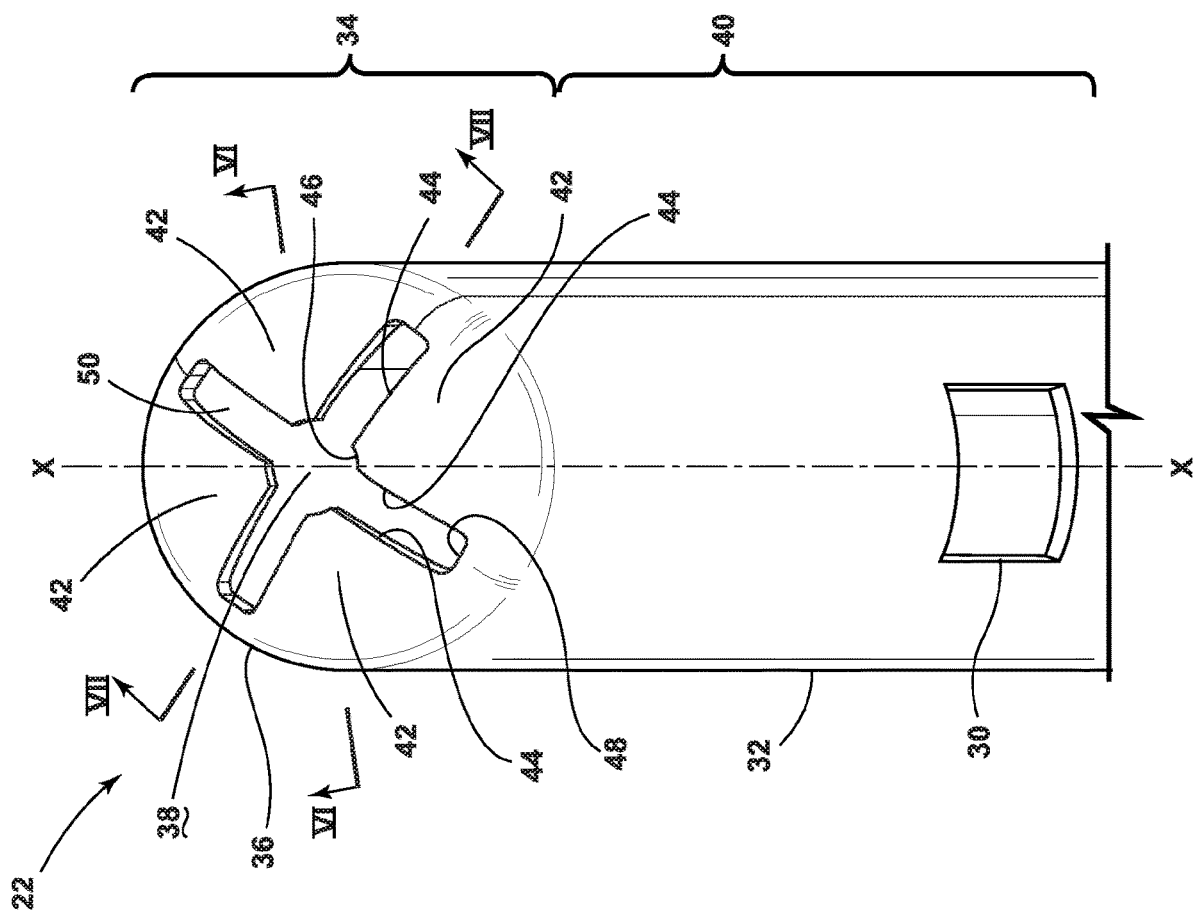
FIG. 5 is a perspective view of one end of the headrest stay of FIG. 2.
Figure 7:
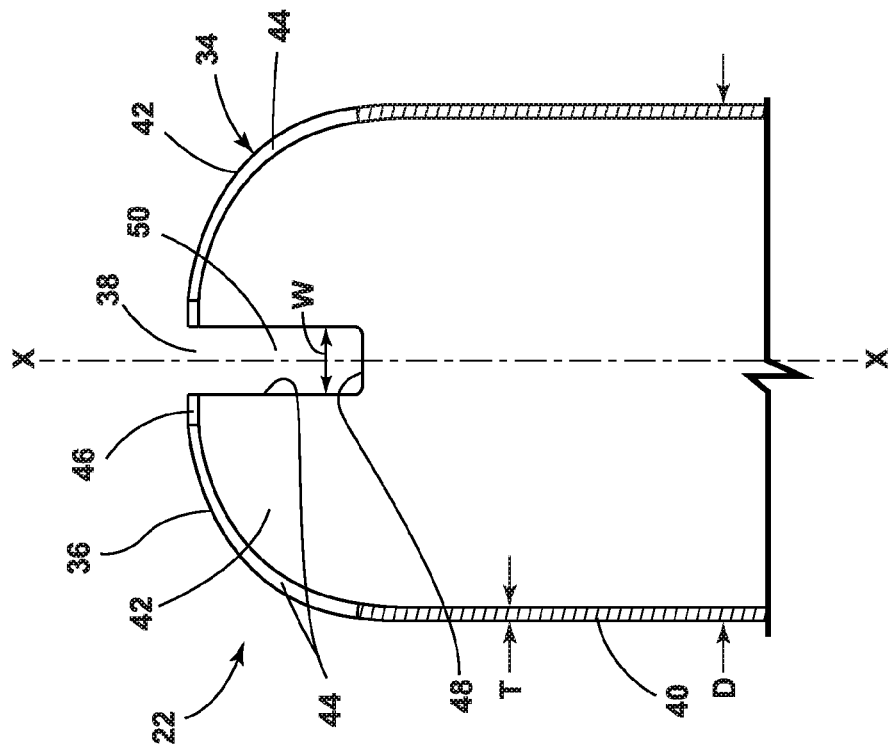
FIG. 7 is a cross-sectional view taken through line VII-VII of FIG. 5.
Figure 6:
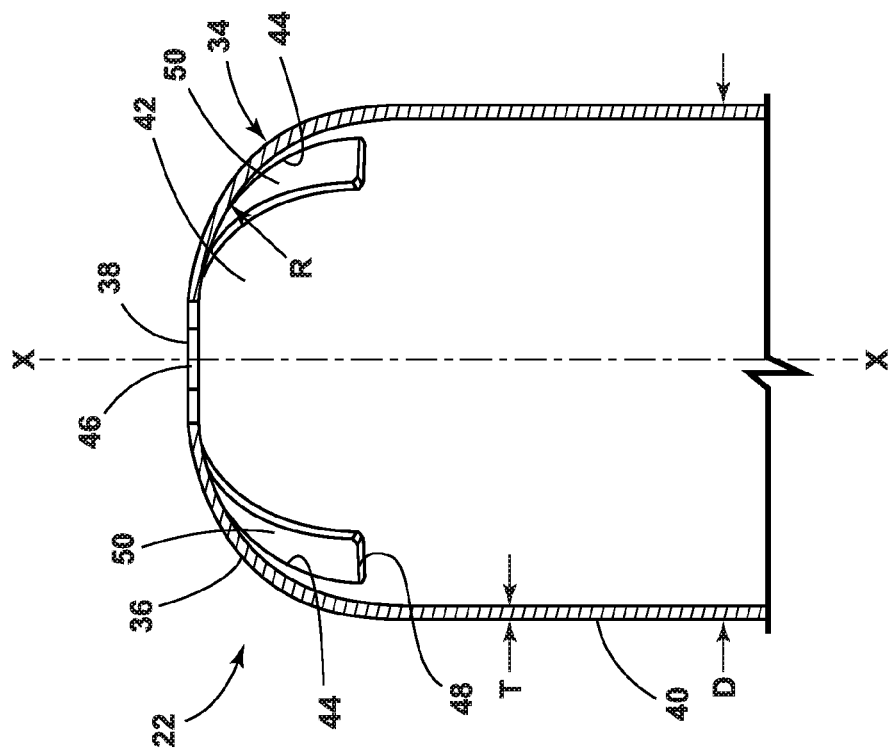
FIG. 6 is a cross-sectional view taken through line VI-VI of FIG. 5.

FIG. 5 is a close up view of one of the insertion ends 22 of the headrest stay 10, and FIGS. 6-7 are cross-sectional views through the insertion end 22 of FIG. 5. The headrest stay 10 comprises a tubular body 32, e.g. a round pipe, defining the insertion end 22 and an endform 34 on the insertion end 22. The endform 34 includes a chamfered end 36 with a radius R and a hole 38 formed through the chamfered end 36. The radius R can be constant along the chamfered end 36, or can vary.

The insertion end 22 can be elongated, and define a longitudinal axis X. The chamfered end 36 and/or hole 38 can be radially symmetrical with respect to the longitudinal axis X. In the embodiment shown in FIG. 5, the chamfered end 36 and hole 38 have a fourfold radial symmetry, i.e. there are 4 planes containing the longitudinal axis X that divide the chamfered end 36 and hole 38 into similar halves. In other embodiments, the chamfered end 36 and/or hole 38 can be non-radially-symmetrical with respect to the longitudinal axis X.

The notch 30 is formed in the insertion end 22, proximal of the endform 34, i.e. spaced axially from the endform 34 with respect to a longitudinal axis X of the insertion end 22.

The insertion end 22 includes a cylindrical sidewall 40 that is continuous with the endform 34 and configured to be insertable into the sleeve 16 (FIG. 2). The tubular body 32 can have a constant thickness T, including at the cylindrical sidewall 40 and endform 34, with the thickness T measured between the outer and inner surfaces thereof. In other words, the thickness of the cylindrical sidewall 40 is the same as the thickness of the endform 34.

The cylindrical sidewall 40 defines an outer diameter D of the insertion end 22. The outer diameter D is preferably constant along at least the insertion end 22, and may further be constant along the leg 20 of the stay 10 defining the insertion end 22. While a constant diameter D is shown, in other embodiments, the diameter along the leg 20 may vary, such as including a necked-down insertion end 22 on the leg 20.

The chamfered end 36 is formed by a plurality of teeth 42 that curve toward the longitudinal axis X of the insertion end 22. The teeth 42 comprise discrete features formed at the distal end of the insertion end 22. The teeth 42 project longitudinally from the cylindrical sidewall 40 and can curve both inwardly toward the longitudinal axis X and radially around the longitudinal axis X.

The chamfered end 36 can be defined by four teeth 42 as shown. As will be understood by those of skill in the art in view of this disclosure, the chamfered end 36 may comprise any number of teeth 42, and the teeth 42 may be the same as or different from any other of the teeth 42 of the chamfered end 36. For example, in certain embodiments, the chamfered end 36 comprises two or more teeth 42, alternatively three teeth 42, alternatively eight teeth 42, alternatively more than four teeth 42, alternatively from 2 to 8 teeth 42.

Generally, the teeth 42 can have any shape suitable to be pressed inwardly toward the longitudinal axis X of the insertion end 22 during endforming, and described in further detail below. The teeth 42 in the embodiment of FIGS. 5-6 have a triangular or saw-tooth shape. As will be understood by those of skill in the art in view of this disclosure, the teeth 42 may comprise other shapes, which may be the same as or different from any other of the teeth 42 of the chamfered end 36. Some non-limiting examples of shapes for the teeth 42 include a rounded or convex shape, a trapezoidal shape, or a sinusoidal shape. Generally, any shape where side edges of the teeth coverage toward each other, such as toward or to a tip will be suitable for forming the chamfered end 36.

In the embodiment of FIGS. 5-6, the teeth 42 have two side edges 44 that converge at a tip 46. Adjacent teeth 42 are joined at a juncture 48, which can be a base edge extend between ends of the side edges 44 opposite the tip 46. In another embodiment, the juncture 48 can comprise a point at which adjacent teeth 42 are joined. Outer surfaces of the teeth 42 can collectively form the chamfered end 36, with the tips 46 of the teeth collectively defining the hole 38.

The teeth 42 can, in some embodiments, be separated by slots 50 or other openings between side edges 44 of adjacent teeth 42. The slot 50 can defined a continuous or intermittent gap between adjacent side edges 44. In such embodiments, the slots 50 can define portions of the hole 38, with the hole 38 extending between adjacent side edges 44 to the juncture 48.

A width W of the slot 50 can generally be defined by the distance between adjacent side edges 44. In embodiments where the side edges 44 of adjacent teeth 42 are parallel, such as in FIGS. 5-6, the width W can be constant along the length of the slot 50. In such embodiments, the width W can equal to the length of the juncture 48 extending between adjacent teeth 42.

In other embodiments, the side edges 44 of adjacent teeth 42 can be non-parallel, and the width W can accordingly be non-constant along the length of the slot 50. For example, the side edges 44 of adjacent teeth 42 can converge in a direction toward the tips 46 of the teeth 42, in which case the width W of the slot 50 can decrease toward the tips 46. In another example, the side edges 44 of adjacent teeth 42 can converge in a direction toward the juncture 48 of the teeth 42, in which case the width W of the slot 50 can decrease toward the juncture 48.

The endform 34 on the headrest stay 10 is generally formed in the following steps. That is, tubular body 32 having longitudinal axis X is cut to form two or more teeth 42, and after that, the toothed end is pressed into a mold to form a chamfered endform, e.g. chamfered end 36, where the two or more teeth 42 are pressed toward the longitudinal axis X of the tubular body 32.

The headrest stay 10 is generally formed in the following steps. That is, tubular stock material is cut or otherwise provided in a desired or predetermined length, teeth are cut into one or both ends of the tubular body, and one or both ends are chamfered by pressing the teeth toward the longitudinal axis of the tubular body. Depending on the requirements of the headrest stay 10, the tubular body can be bent to complete a general predetermined shape of the headrest stay, notched, and/or plated.

A method for manufacturing a headrest stay formed end will now be described with reference to FIGS. 8-12. The sequence of steps discussed is for illustrative purposes only and is not meant to limit the method in any way as it is understood that the steps may proceed in a different logical order, additional or intervening steps may be included, or described steps may be divided into multiple steps. For purposes of description, the method is described with respect to the headrest stay 10 of FIGS. 2-7, although it is understood that other headrest stays may be manufactured using the disclosed method.

Figure 8:
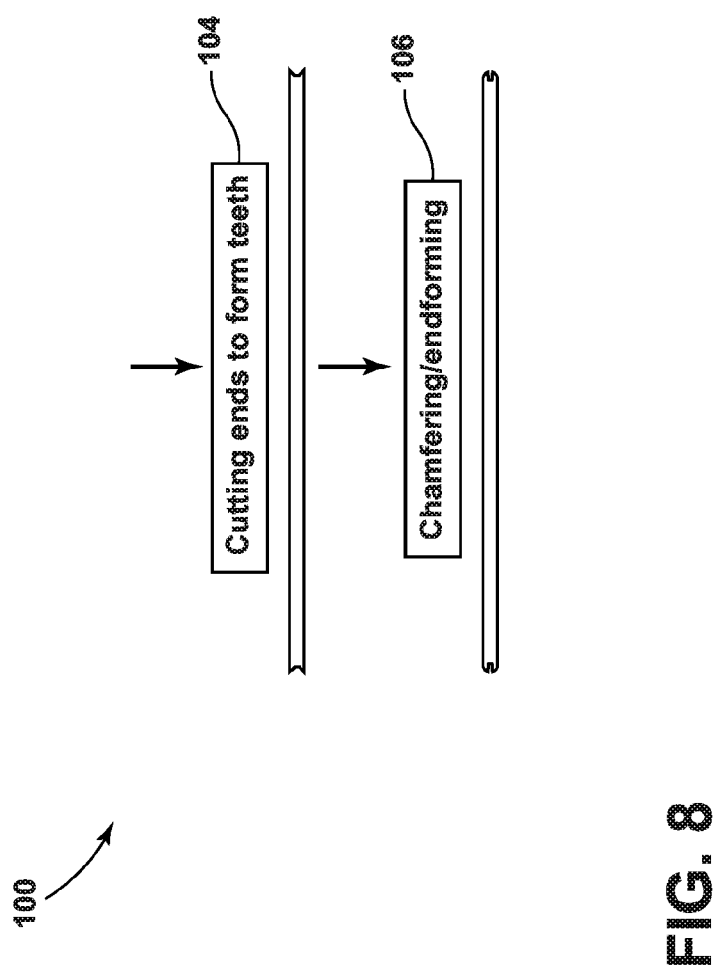
FIG. 8 is a process diagram of a method for manufacturing a headrest stay formed end according to an embodiment of the present disclosure.

FIG. 8 is a process diagram of a method 100 for manufacturing a headrest stay formed end. The headrest stay 10 is generally formed in the following steps. That is, cutting teeth into opposite ends of the tubular body in step 104 and chamfering the opposite ends of the tubular body in step 106 by pressing the teeth toward the longitudinal axis of the tubular body. FIGS. 9-12 illustrate some of the steps of the method 100 in detail.

As shown in FIG. 9, the method can begin with a tubular body 32, e.g. a round pipe, which is generally linear, and has a tube-shaped end 52 with an outer diameter D1, an inner diameter D2, and wall thickness T. The tubular body 32 can be formed using any suitable tube-forming process can be used to form the tube, such as milling, rolling, stamping, drawing, or coining, and may also be used individually or in combination to form the tubular body 32. The tubular body 32 can be cut to a desired length after tube-forming, or otherwise provided in the desired length for the headrest stay 10. The length can be determined based on the desired length of the finished headrest stay 10, including accounting for the removal of material from the ends of the tube to form the teeth 42 and adjusting for any distortion or stretching that may occur during the manufacturing processes to finish the headrest stay 10, such as bending in the case of a U-shaped tube.

The tubular body 32 has opposite ends, only one end 52 of which is shown in FIG. 9. The ends 52 can define the insertion ends 22 of the finished headrest stay 10. As shown in FIG. 9, the tube-shaped end 52 can have an edge 54 of a first shape. The first shape may be a blunt edge, i.e. a straight or oblique edge made by cutting down stock tubular material to the desired length or other step of providing the tubular body 32 of generally the required length for the headrest stay.

Next, as shown in FIG. 10, a cutting process is performed on the tubular body 32 form a plurality of teeth 42 by removing material from the tubular body 32. In one embodiment, the cutting process is performed on the tube-shaped end 52 to remove material from the tube-shaped end 52 without changing the wall thickness T, i.e. without thinning the sidewall 40. In another embodiment, the tubular body 32 can be cut at another location along the length of the body, in which case the cutting of teeth 42 can simultaneously cut a tubular stock material down to a desired length, without changing the wall thickness T where the toothed end is cut. The amounts and shapes of material being removed may vary depending on the endform and/or headrest stay product requirements. The removal of material can be accomplished by using a laser cutting machine or other suitable processes for removing material from the tube-shaped end 52. Other suitable methods for material removal include but are not limited to water jet cutting and electrical discharge machining (EDM).

The amount and shapes of material being removed can vary depending on the requirement for the shape of the end 52. After material removal, the tube-shaped end 52 has an edge 56 with a second shape defining at least two teeth 42, and is also referred to herein as a toothed end. The second shape 56 can vary, with varying numbers and shapes of teeth 42, depths of cuts, and profiles of cuts, but is different from the first shape 54.

After the cutting process, the outer diameter D1, an inner diameter D2, and wall thickness T are preferably unchanged, or substantially unchanged. Therefore, the teeth 42 can have the same wall thickness T as the sidewall 40, and define the same outer diameter D1 and inner diameter D2. Also at this stage of the method 100, the teeth 42 can lie generally parallel to the longitudinal axis X.

FIG. 11 is a plane view of the teeth 42 as they would appear if the tubular body 32 were unrolled and laid in a flat condition. In the embodiment shown, each tooth 42 include side edges 44 and tip 46, the side edges 44 and tip 46 disposed at a distal portion thereof. The tips 46 are radially spaced from the longitudinal axis X. Each tooth 42 can include a proximal portion that has two proximal side edges 58 joined with the distal side edges 44 at a shoulder 60. Adjacent teeth 42 are joined at a juncture 62, which can be a point at which adjacent teeth 42 are joined. In another embodiment, the juncture 48 can comprise a base edge extend between ends of the side edges 58. As will be described in detail below, during endforming, the proximal side edges 58 of adjacent teeth 42 can close together to bring the shoulders 60 into contact with each other and form the juncture 48 between the adjacent teeth 42.

Figure 12:
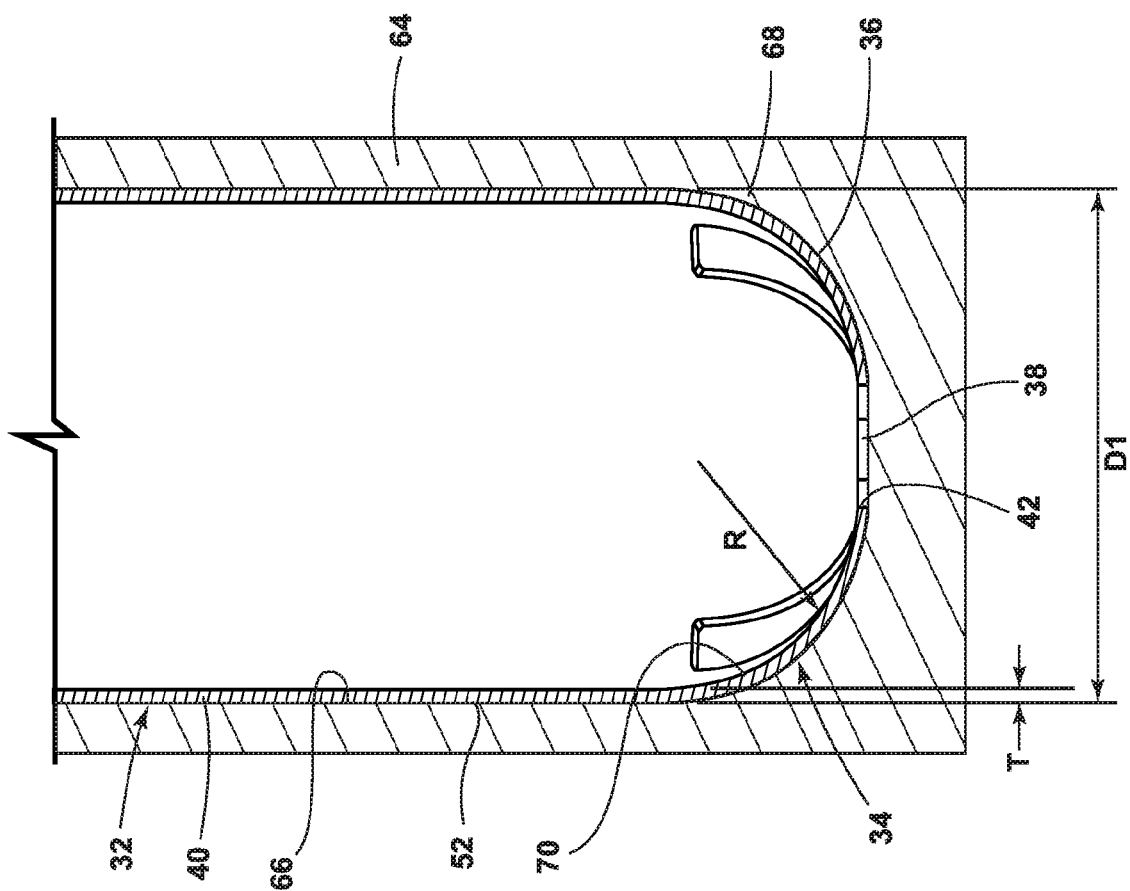
FIG. 12 is a cross-sectional view showing an endforming process for the headrest stay of FIG. 10, showing the headrest stay in a press mold for chamfering the end.

Next, as shown in FIG. 12, an endforming process is performed on the toothed end of the tubular body 32 to form the endform 34 having chamfered end 36, for example using a press mold or other suitable machine. The end 52 can be pressed in a pressing direction along the longitudinal axis X against a press mold 64 having a cylindrical cavity 66 with a rounded end portion 68 so that a chamfered shape is imparted to the end 52. The rounded end portion 68 can have a concave inner surface 70 formed at the corner between the side and bottom of the cylindrical cavity 66. The cylindrical cavity 66 can have an inner diameter sized for insertion of the end 52 therein, i.e. slightly larger than outer diameter D1. As the end 52 meets the rounded end portion 68, the teeth 42 are pressed inward toward the longitudinal axis X and conform to the concave inner surface 70. The concave inner surface 70 can have a radius R, which imparts a chamfered shape with radius R to the teeth 42 by bending the teeth 42 into a curved shape having the same radius R as the concave inner surface 70. Outer surfaces of the teeth 42 form the chamfered end 36. The tips 46 are forced closer to the longitudinal axis X by the endforming, leaving hole 38 where the teeth 42 do not meet.

Figure 1B:
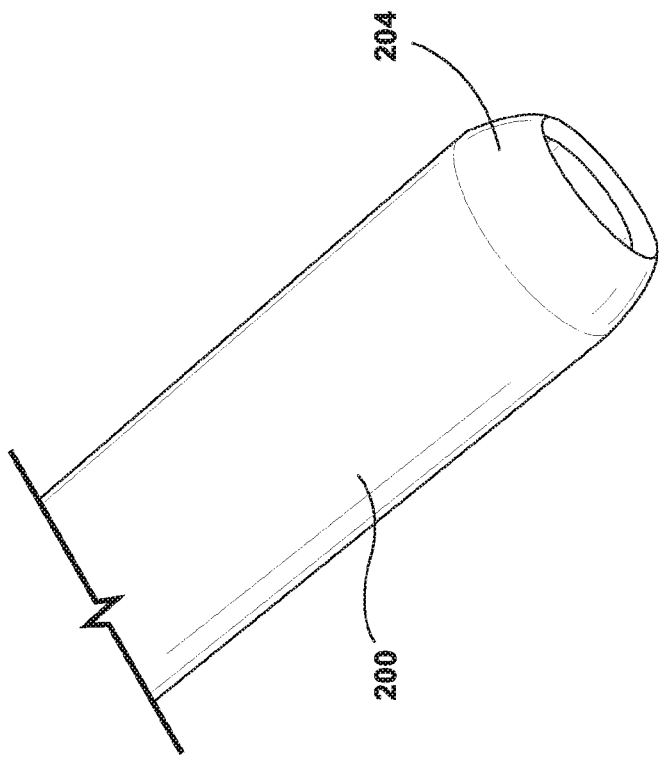
FIG. 1B shows the prior art headrest stay of FIG. 1A after formation of an endform on the tube.
Figure 1A:
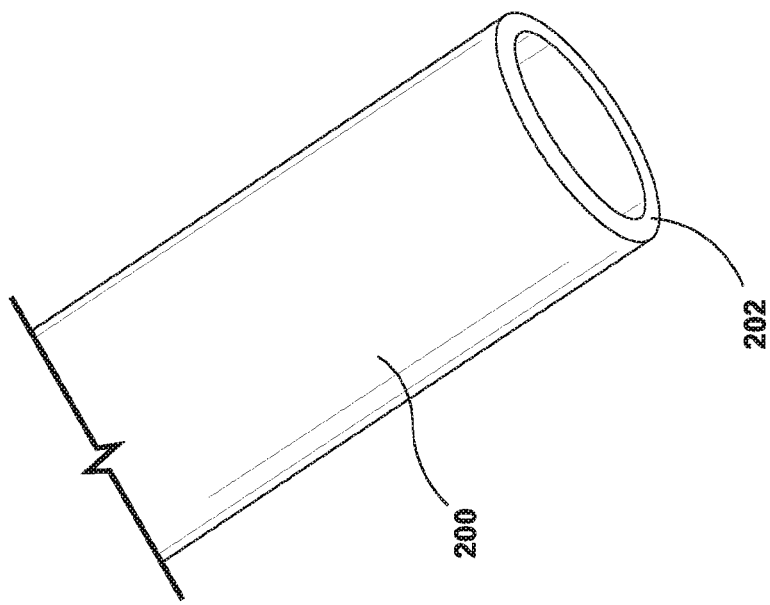
FIG. 1A shows a prior art headrest stay with a straight cut end prior to formation of an endform on the tube.

The force required to form the endform 34 is considerably less than the force required to form prior art endforms, such as the endform of FIG. 1A-1B. Using the disclosed method 100, the endforming or chamfering process requires less than 2,000 lbs. of force. The exact amount of force required may vary, depending on factors such as tube material, thickness, and diameter, but is far less than the average 30,000 lbs. of force required of typical endforming processes. Also, minimal cycle time is required. Using the disclosed method 100, the endforming or chamfering process takes one pass to form the endform.

The endforming or chamfering process disclosed herein also does not change the outer diameter D1 of the tubular body 32, i.e. the outer diameter D of the finished headrest stay is the same as the outer diameter D1 of the tubular body 32 prior to endforming. The application of lower force to chamfer the teeth 42 eliminates the resulting swell that can occur to the outer diameter of prior art tubes. In addition, the lower force allows for less expensive tooling to form the endform 34.

Figure 13:
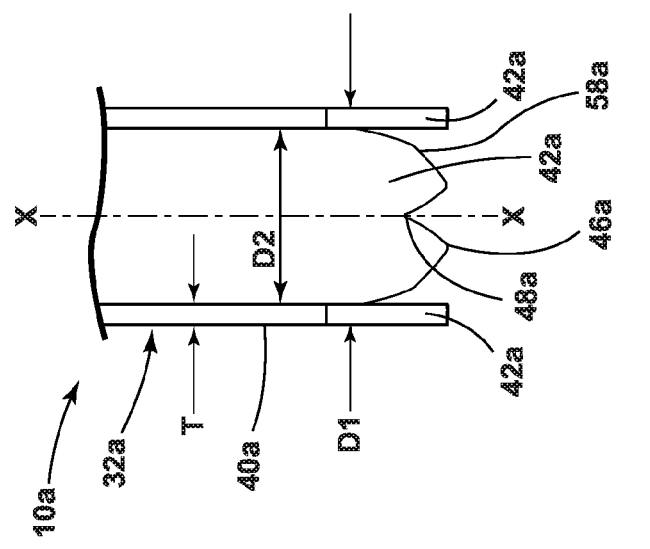
FIG. 13 is a perspective view of one end of a headrest stay having an endform according to another embodiment of the present disclosure.
Figure 14:
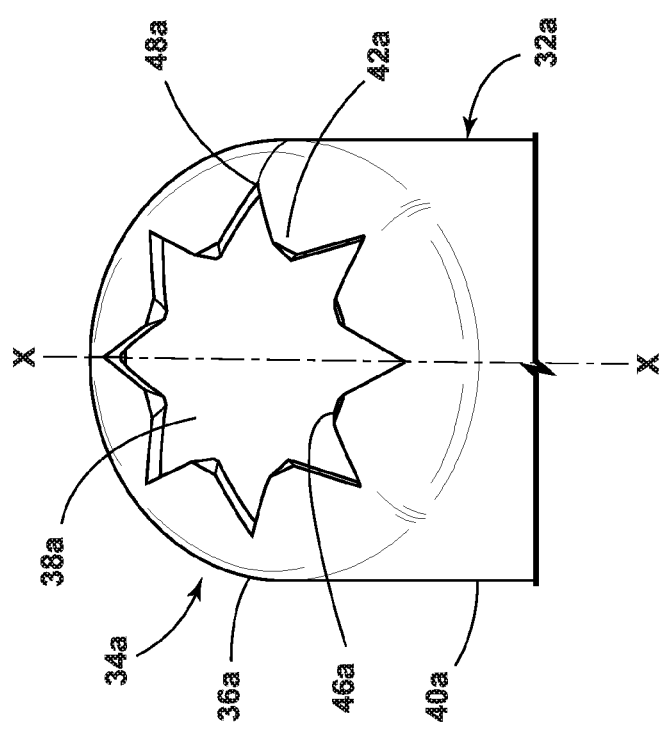
FIG. 14 is a cross-sectional view of the headrest stay of FIG. 13 prior to endforming and after a plurality of teeth have been cut in the end.
Figure 15:
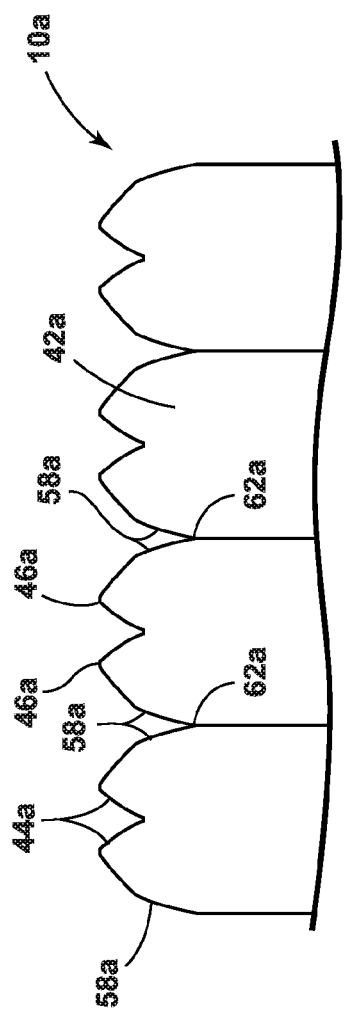
FIG. 15 is a plane view of the teeth of the headrest stay of FIG. 14 as they would appear if the end were unrolled and laid in a flat condition.

FIGS. 13-15 show another embodiment of an endform 34a for a headrest stay 10a. The embodiment of FIGS. 13-15 is similar to the embodiment shown in FIGS. 2-7, and may be manufactured according to the method of FIGS. 8-12 and like elements will be referred to with the same reference numerals bearing a letter "a."

FIG. 13 is a perspective view of the endform 34a. The endform 34a includes chamfered end 36a and hole 38a. The chamfered end 36a and/or hole 38a can have an eightfold radial symmetry, i.e. there are 8 planes containing the longitudinal axis X that divide the chamfered end 36a and hole 38a into similar halves. The teeth 42a in the embodiment of FIGS. 13-15 have a triangular or saw-tooth shape, and adjacent teeth 42a are joined at juncture 48a, comprising a point at which adjacent teeth 42a are joined.

FIG. 14 is a cross-sectional view of the same end of the headrest stay 10a prior to endforming, i.e. after teeth 42a have been cut. FIG. 15 is a plane view of the teeth 42a as they would appear if the tubular body 32a were unrolled and laid in a flat condition. In the embodiment shown, each tooth 42a include distal side edges 44a and tip 46a, the side edges 44a and tip 46a disposed at a distal portion thereof. The teeth 42a are arranged in pairs that extend from a common proximal portion. The proximal portion that has two proximal side edges 58a joined with the outermost distal side edges 44a of the pair of teeth 42a. Adjacent teeth pairs are joined at a juncture 62a, which can be a point at which adjacent teeth pairs are joined. During endforming, the proximal side edges 58a of adjacent teeth pairs can close together and form the juncture 48a between the adjacent teeth pairs.

Figure 17:
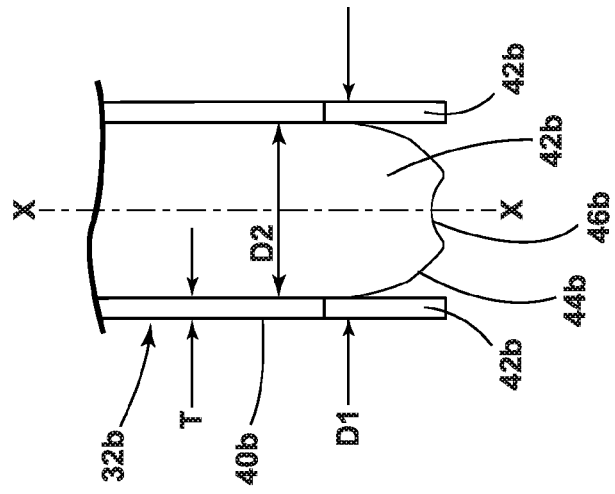
FIG. 17 is a cross-sectional view of the headrest stay of FIG. 16 prior to endforming and after a plurality of teeth have been cut in the end.
Figure 16:
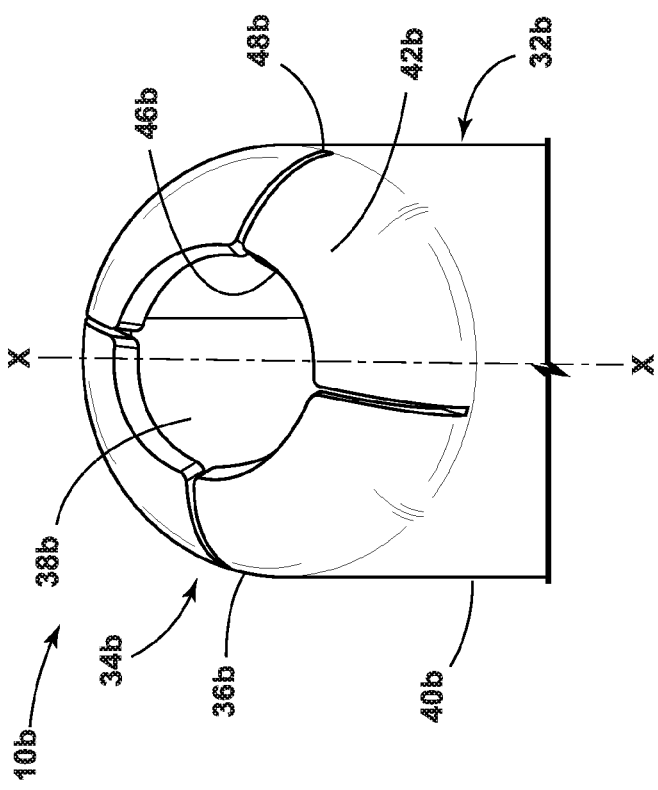
FIG. 16 is a perspective view of one end of a headrest stay having an endform according to yet another embodiment of the present disclosure.
Figure 18:
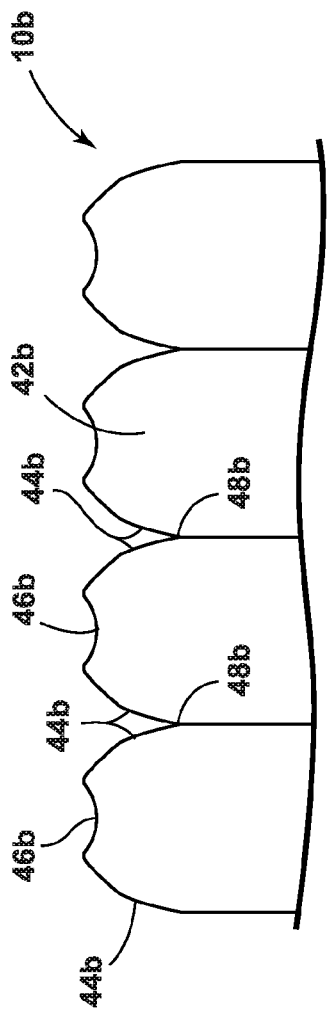
FIG. 18 is a plane view of the teeth of the headrest stay of FIG. 17 as they would appear if the end were unrolled and laid in a flat condition.

FIGS. 16-18 show yet another embodiment of endform 34b for a headrest stay 10b. The embodiment of FIGS. 16-18 is similar to the embodiment shown in FIGS. 2-7, and may be manufactured according to the method of FIGS. 8-12 and like elements will be referred to with the same reference numerals bearing a letter "b."

FIG. 16 is a perspective view of the endform 34b. The endform 34b includes chamfered end 36b and hole 38b. The chamfered end 36b and/or hole 38b can have an fourfold radial symmetry, i.e. there are 4 planes containing the longitudinal axis X that divide the chamfered end 36b and hole 38b into similar halves. The teeth 42b in the embodiment of FIGS. 16-18 have a trapezoidal shape, and adjacent teeth 42b are close together, such that there is little to no space between adjacent teeth 42b, and the hole 38a is effectively defined by the tips 46b of the teeth 42b.

FIG. 17 is a cross-sectional view of the same end of the headrest stay 10b prior to endforming, i.e. after teeth 42b have been cut. FIG. 18 is a plane view of the teeth 42b as they would appear if the tubular body 32b were unrolled and laid in a flat condition. In the embodiment shown, each tooth 42b include side edges 44b and tip 46b. The tips 46b of the teeth 42b are broad, and may have a length greater than or equal to the length of the side edges 44b. The tips 46b of the embodiment shown are curved, and in the embodiment shown have a concave curvature prior to endforming, such that the finished hole 38b is substantially circular as shown in FIG. 16. During endforming, the side edges 44b of adjacent teeth 42b can close together to bring the side edges 44b into contact, or nearly into contact.

Figure 19C:
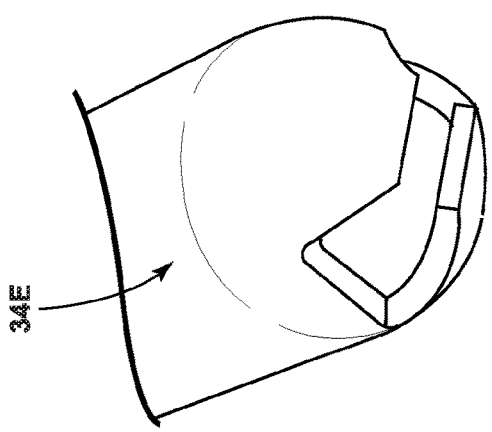
FIGS. 19A-19C are perspective views of headrest stays having endforms according to still other embodiments of the present disclosure.
Figure 20C:
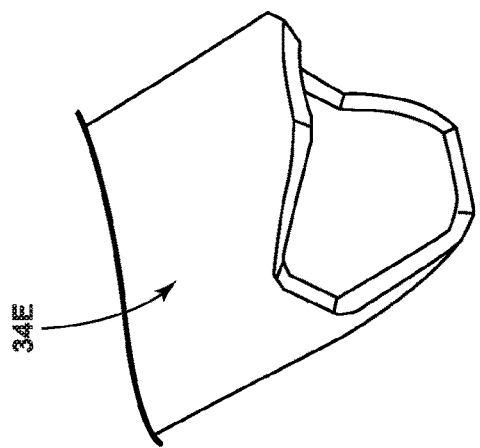
FIGS. 20A-20C are perspective views of the headrest stays of FIGS. 19A-19C prior to endforming.
Figure 19B:
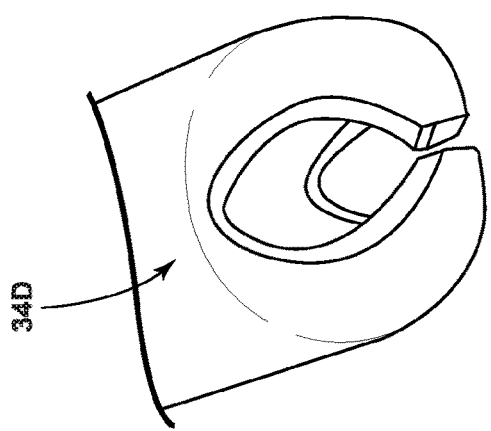
Figure 20B:
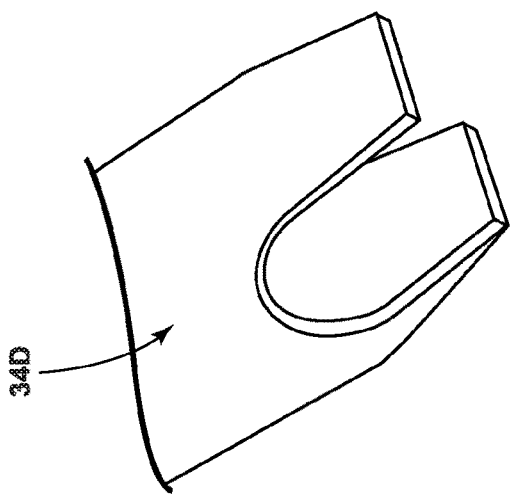
Figure 19A:
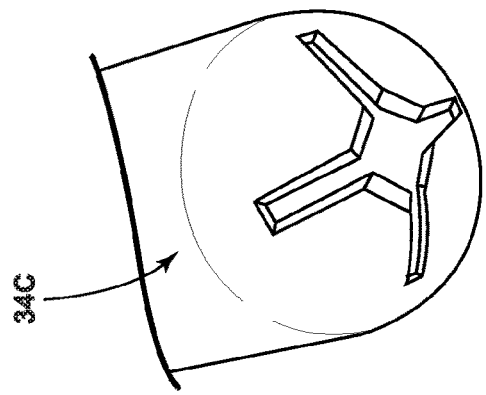
Figure 20A:
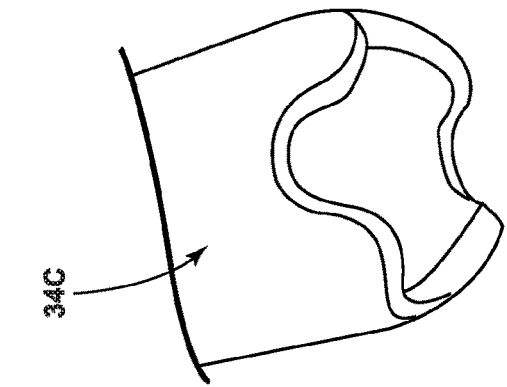

FIGS. 19A-19C show still other embodiments of endforms 34c, 34d, 34e for headrest stays. FIGS. 20A-20C show tubular bodies with cuts prior to forming with varying numbers of teeth, shape of teeth, depths of cuts, and profiles of cuts. FIGS. 19A-19C show the tubes after endforming.

There are several advantages of the present disclosure arising from the various features of the methods and apparatuses described herein. For example, the embodiments of the invention described above provides a method of manufacturing a headrest stay that requires less than 2000 lbs. of force to chamfer the endform. By forming teeth in the ends of the tube, less force is required to press the teeth toward the longitudinal axis of the tube end during chamfering.

Other embodiments of the invention described above provides a headrest stay with a chamfered end formed by a plurality of teeth that curve toward the longitudinal axis of the tube end. The teeth are formed or cut without changing the wall thickness, outer diameter, or inner diameter of the tube end.

Another advantage of some embodiments of the present disclosure is improved vehicle passenger safety. For example, in the event that the headrest ejects from the seat during an accident, the endform reduces the likelihood of injury to passengers.

Although the present invention has been described in conjunction with a headrest stay, the present invention has applicability beyond headrest stays.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientations.

The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as"

means "for example, but not limited to" or "such as, but not limited to" and encompasses other similar or equivalent examples.

It is to be understood that the appended claims are not limited to express and particular apparatus or methods described in the detailed description, which may vary between particular embodiments that fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

The present invention has been described herein in an illustrative manner, and it is to be understood that the terminology that has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

What is claimed is:

1. A headrest stay for mounting a headrest to a vehicle seat, the headrest stay comprising:
   a tubular body having an insertion end defining a longitudinal axis and including a cylindrical sidewall, the insertion end configured to be inserted into a headrest sleeve attached to the vehicle seat to mount the headrest to the vehicle seat; and
   a plurality of teeth cut into the insertion end and extending from the cylindrical sidewall;
   wherein each of the plurality of teeth bend toward the longitudinal axis in a curved shape that curves inwardly toward the longitudinal axis and radially around the longitudinal axis to collectively form a rounded chamfered endform on the insertion end and a hole through the rounded chamfered endform.

2. The headrest stay of claim 1, wherein the plurality of teeth includes at least one tooth having two side edges that converge at a tip.

3. The headrest stay of claim 1, wherein the plurality of teeth includes two adjacent teeth joined at a juncture and separated by a slot between the two adjacent teeth, the slot defining at least a portion of the hole formed through the chamfered endform.

4. The headrest stay of claim 3, wherein the plurality of teeth comprise tips which collectively define at least a portion of the hole formed through the chamfered endform.

5. The headrest stay of claim 4, wherein the juncture is wider than a width of the tips of the two adjacent teeth.

6. The headrest stay of claim 3, wherein the slot comprises a width equal to a length of the juncture between the two adjacent teeth.

7. The headrest stay of claim 1, comprising a notch in the cylindrical wherein the notch is spaced axially from the chamfered endform and is configured to receive a locking pin of the headrest sleeve to engage the headrest stay with the headrest sleeve.

8. The headrest stay of claim 1, wherein the insertion end comprises a first insertion end, and wherein the tubular body comprises a tube bent into an approximate U-shape to define a base, a first leg extending from the base and comprising the first insertion end and a second leg extending from the base and comprising a second insertion end.

9. The headrest stay of claim 1, wherein the plurality of teeth includes two adjacent teeth having distal side edges and a proximal side edges joined with the distal side edges, wherein the proximal side edges are in contact with each other to form a juncture between the adjacent teeth and the distal side edges are separated by a slot between the two adjacent teeth.

10. The headrest stay of claim 9, wherein the juncture comprises a base edge between the two adjacent teeth and the two adjacent teeth each comprise a shoulder where the proximal side edges are joined with the distal side edges, and wherein the shoulders are in contact with each other to form the base edge.

11. The headrest stay of claim 1 wherein the rounded chamfered endform comprises slots separating adjacent teeth, and wherein the slots curve inwardly toward the longitudinal axis.

12. The headrest stay of claim 1, wherein the cylindrical sidewall and the plurality of teeth comprise the same thickness.

13. The headrest stay of claim 1 wherein the plurality of teeth each comprise two side edges that converge at a tip, wherein the side edges of adjacent teeth are non-parallel and converge toward each other in a direction toward the tips of said adjacent teeth such that a distance between the side edges of adjacent teeth decreases in a direction toward the tips of said adjacent teeth.

14. The headrest stay of claim 1 wherein the plurality of teeth comprises at least four teeth and the rounded chamfered endform comprises a fourfold radial symmetry with respect to the longitudinal axis.

15. The headrest stay of claim 1 wherein the rounded chamfered endform is a convex chamfered endform and is radially symmetrical about the longitudinal axis.

16. A headrest stay for mounting a headrest to a vehicle seat, the headrest stay comprising:
   a tubular base,
   a first tubular leg extending from the tubular base and comprising a first insertion end defining a first longitudinal axis, the first insertion end configured to be inserted into a first headrest sleeve attached to a vehicle seat;
   a second tubular leg extending from the tubular base and comprising a second insertion end defining a second longitudinal axis, the second insertion end configured to be inserted into a second headrest sleeve attached to a vehicle seat;
   a first plurality of teeth cut into the first insertion end and curved toward the first longitudinal axis to collectively form a rounded chamfered endform and a hole on the first insertion end, wherein each of the first plurality of teeth bend toward the first longitudinal axis in a curved shape that curves inwardly toward the first longitudinal axis and radially around the first longitudinal axis; and
   a second plurality of teeth cut into the second insertion end and curved toward the second longitudinal axis to collectively form a rounded chamfered endform and a hole on the second insertion end, wherein each of the second plurality of teeth bend toward the second longitudinal axis in a curved shape that curves inwardly toward the second longitudinal axis and radially around the second longitudinal axis.

17. The headrest stay of claim 16 wherein:
the first plurality of teeth are separated by slots that inwardly toward the first longitudinal axis; and
the second plurality of teeth are separated by slots that curve inwardly toward the second longitudinal axis.

18. The headrest stay of claim 17 wherein each of the slots are defined by side edges of adjacent teeth, wherein said side edges are non-parallel.

19. The headrest stay of claim 16, wherein:
the first tubular leg comprises a first cylindrical sidewall and the second tubular leg comprises a second cylindrical sidewall; and
the first cylindrical sidewall, the second cylindrical sidewall the first plurality of teeth, and the second plurality of teeth comprise the same thickness.

20. The headrest stay of claim 16, wherein the rounded chamfered endform formed by the first plurality of teeth is a convex chamfered endform and is radially symmetrical about the first longitudinal axis and the rounded chamfered endform formed by the second plurality of teeth is a convex chamfered endform and is radially symmetrical about the second longitudinal axis.

\* \* \* \* \*